(12) United States Patent
Disler

(10) Patent No.: US 7,127,846 B1
(45) Date of Patent: Oct. 31, 2006

(54) PESTICIDE INJECTION SYSTEM

(76) Inventor: Gregory A. Disler, 14 Heath Rd., Peabody, MA (US) 01960

( * ) Notice: Subject to any disclaimer, the term of this patent is extended or adjusted under 35 U.S.C. 154(b) by 0 days.

(21) Appl. No.: 11/313,182

(22) Filed: Dec. 19, 2005

(51) Int. Cl.
*A01M 1/20* (2006.01)

(52) U.S. Cl. ........................ 43/132.1; 43/124
(58) Field of Classification Search ................ 43/124, 43/132.1, 134, 131
See application file for complete search history.

(56) References Cited

U.S. PATENT DOCUMENTS

| | | | |
|---|---|---|---|
| 3,209,485 A | 10/1965 | Griffin | |
| 4,648,202 A | 3/1987 | Renth | |
| 4,823,505 A | 4/1989 | Jackson | |
| 4,944,110 A | 7/1990 | Sims | |
| 4,945,673 A | 8/1990 | Lavelle | |
| 5,058,312 A | 10/1991 | Jackson | |
| 5,361,533 A | 11/1994 | Pepper | |
| 6,493,987 B1 | 12/2002 | Aesch, Jr. et al. | |
| 6,708,444 B1 | 3/2004 | Aesch, Jr. | |
| 6,840,004 B1 | 1/2005 | Allen | |

*Primary Examiner*—Darren W. Ark
*Assistant Examiner*—John D. Holman
(74) *Attorney, Agent, or Firm*—Joseph R. Birkner

(57) ABSTRACT

A pesticide injection system for exterminating insects is provided. The pesticide injection system comprises an applicator; an insert and a plug frictionally engagable with a wall. The applicator includes a pliable bottle for receiving a powder pesticide and a nozzle with an end cap for displacing insulation so the powder pesticide can be injected onto a blind space behind a wall suspected of harboring insects without the powder pesticide contacting the insulation. The means for sealing the nozzle to prevent the powder pesticide from spilling into a living space during use is one of an "O" ring and a ribbed seal. The insert has a plurality of fins engaging a locking tab on the plug. The means for preventing back flow is a check valve. The means for selectively covering a first end of a tube on the plug is one of a door and a cap.

20 Claims, 7 Drawing Sheets

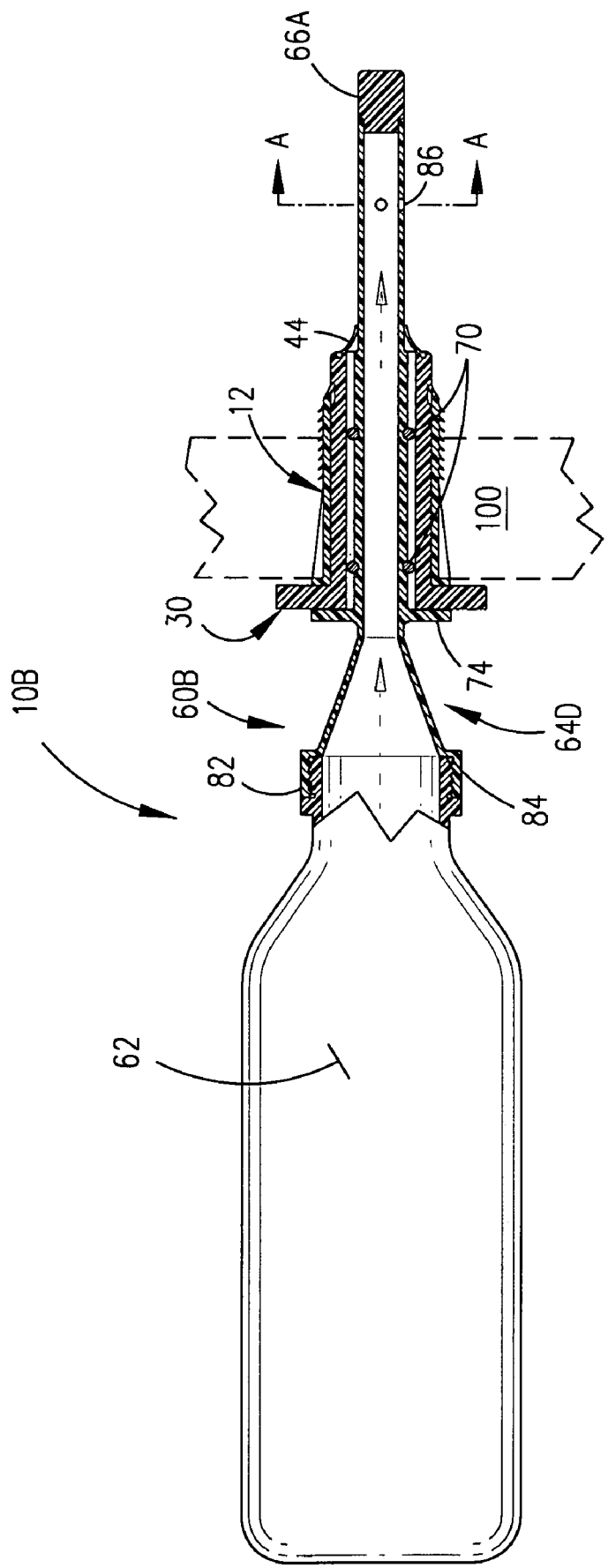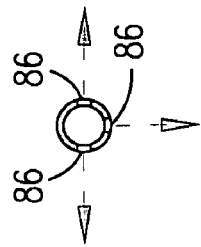
FIG. 3
FIG. 3A

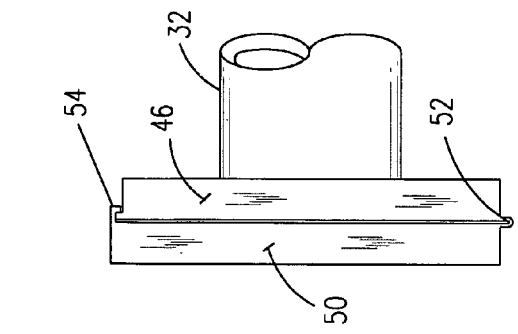
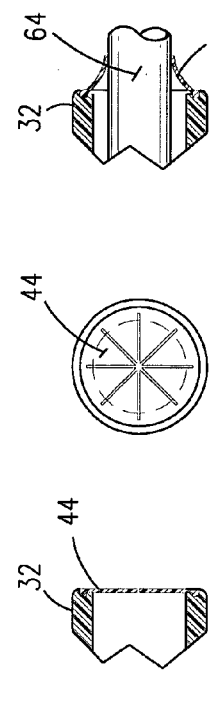
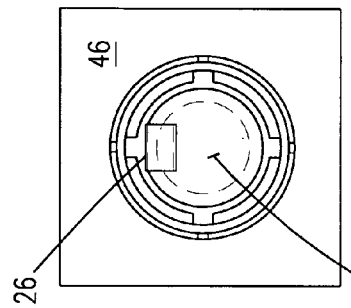
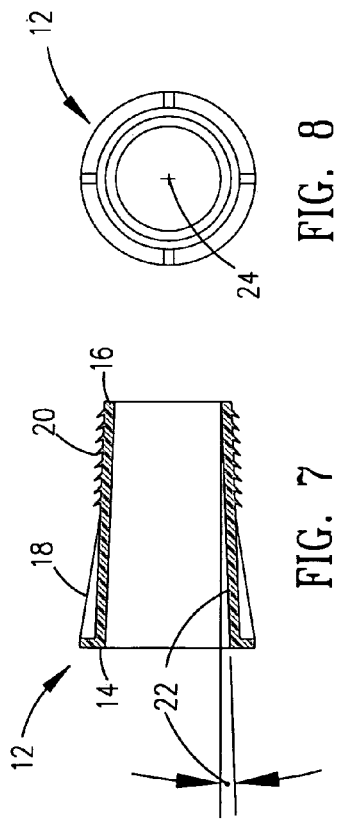
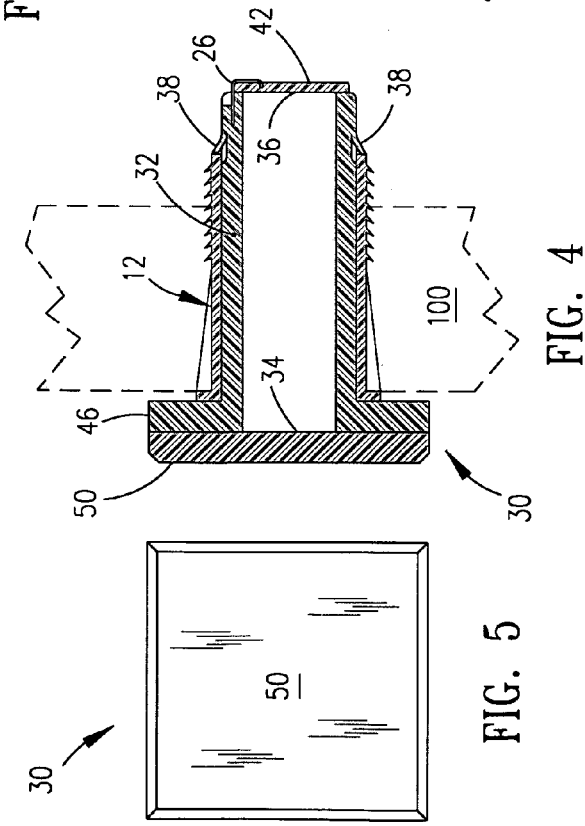
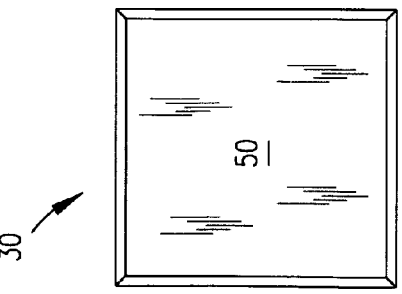

PESTICIDE INJECTION SYSTEM

FIELD OF THE INVENTION

This invention relates generally to pest control. More particularly, the present invention relates to a pesticide injection system for treating potential insect infected areas in a blind wall cavity.

BACKGROUND OF THE INVENTION

Pest control of insects is usually provided by professional exterminators who fumigate an insect infected area of a structure by spraying liquefied chemicals into such areas. More often than not, treated areas must be sprayed regularly, ie. weekly or monthly. Also, during chemical spraying, the home owners are often asked to leave the home. The above issues cause the building or home owner inconvenience and an added expense as well as safety concerns especially to children and pets who may later come into contact with the toxic chemicals. If professional exterminators are felt to be not needed, the home owners try to apply sprays and powders themselves leaving them open to safety issues as well as ineffectively treating the affected areas. Commercial establishments such as restaurants are even more at risk for health and safety issues as a result of extermination services. Schools, houses of worship and other buildings also are adversely affected by dangerous extermination spraying systems. Typically, treated interior areas, in either a home or in a restaurant, for example, such as kitchen or bathroom floors or under sinks, are, at best, temporarily treated since, when the floors or sink areas are cleaned, the pesticide is washed away and is wasted. At times, professional exterminators may drill holes into blind wall or cabinet cavities, spray pesticide directly into the suspected insect nest area and then seal the drilled hole with putty. This leaves unsightly evidence of wall penetration, and most importantly, prevents convenient access to the area behind the wall or cabinet since the hole is sealed. Also, the putty can deteriorate and toxic chemicals can leach out of the wall cavity through the hole and enter the living and working space. Re-treatment is inconvenient and oftentimes too late, if reapplied, after damage is done by insects. There is no way a home owner or commercial building owner can treat the area periodically themselves, rather, they must rely on the services of a professional exterminator which is undesirable, in most cases.

The inventor recognized a never before addressed problem and fulfilled a need which overcomes the limitations and issues associated with professional extermination systems.

In view of the above mentioned problems and limitations associated with conventional pest control systems, it was recognized by the present inventors that there is an unfulfilled need for a do-it-yourself pest treatment system that is safe and easy to use, is effective and is economical.

Accordingly, it becomes clear that there is a great need for a pesticide injection system which overcomes the disadvantages associated with pest control systems of the prior art. Such a pesticide injection system should be one that works as desired, is safe and easy to use and is economically manufactured.

SUMMARY OF THE INVENTION

It is therefore an object of this invention to provide a pesticide injection system which avoids the aforementioned problems of prior art pest control systems.

It is another object of this invention to provide a pesticide injection system that safely exterminates insect pests hidden within the walls of a structure while preventing the insects from infesting such areas.

It is another object of this invention to provide a pesticide injection system which rapidly permits treatment of a structure by providing a low pressure application of a powder pesticide.

It is another object of this invention to provide a pesticide injection system that minimizes the exposure of pesticides to the occupants of a building.

It is a further object of this invention to provide a pesticide injection system that is readily installed and safely operated by a home owner or do-it-yourselfer.

It is a further object of this invention to provide a pesticide injection system that may be utilized on a wide variety of buildings.

It is a further object of this invention to provide a pesticide injection system which may be manufactured from readily available materials by conventional manufacturing processes.

It is still a further object of this invention to provide a pesticide injection system that is simple in design, simple to manufacture, low in cost, safe and is easy and fun to use.

This invention results from the realization that there is a great need for a highly functional pesticide injection system; the resulting invention provides such benefits.

According to a first aspect of the present invention, disclosed is a pesticide injection system comprising an insert having a first end and a second end and a longitudinal bore therethrough; a taper; a plurality of ribs near the first end and a plurality of fins near the second end each being frictionally engagable with a wall so that the insert is fixed when placed into a hole therein the wall. A plug is matingly and fixedly engageable with the insert. The plug having a tube with a first end and a second end and a locking tab thereon the tube near the second end for cooperatively engaging a portion of the plurality of fins of the insert. The means for preventing back flow disposed on the second end of the tube is a check valve. The plug has a flange integral with the tube. The means for selectively covering the first end of the tube is one of a door and a cap. An applicator having a pliable bottle for receiving a powder pesticide and a nozzle for injecting the powder pesticide into the wall is utilized. The nozzle is removably attachable to the pliable bottle and insertable into the plug. The nozzle has an end cap for displacing insulation to permit the powder pesticide to be injected and to be dispersed directly onto a blind space behind the wall suspected of harboring insects without the powder pesticide contacting the insulation. The means for sealing the nozzle to prevent the powder pesticide from spilling into a living space during use is one of an "O" ring and a ribbed seal.

The second aspect, in accordance with the present invention, is a special case of the first aspect of this invention with additional features. The nozzle has a sliding spring check valve which cooperates with an aperture disposed thereon the nozzle for discharging the powder pesticide, thereby preventing the powder pesticide from spilling into the living space when the nozzle is withdrawn from the plug.

The third aspect of the present invention discloses a method for safely injecting a powder pesticide into a cavity behind a wall.

BRIEF DESCRIPTION OF THE DRAWINGS

In the accompanying drawings:

FIG. 1A is a cross sectional view taken along the plane A—A of the instant invention of FIG. 1;

FIG. 2A is a cross sectional view taken along the plane A—A of the instant invention of FIG. 2;

FIG. 3 is a partial cross sectional view of a third illustrative embodiment of a pesticide injection system of the instant invention in use;

FIG. 3A is a cross sectional view taken along the plane A—A of the instant invention of FIG. 3;

FIG. 4 is a cross sectional view showing an assembly of an insert and a plug installed into a wall shown in phantom;

FIG. 5 is a front elevation view showing the plug of FIG. 4;

FIG. 6 is a right side elevation view of the assembly of FIG. 4 showing a spring loaded swing check valve;

FIG. 7 is a cross sectional view of an insert;

FIG. 8 is a right side elevation view of the insert of FIG. 7;

FIG. 9 is an enlarged partial top plan view showing details of a door, a hinge and a snap lock of the plug of FIG. 4;

FIG. 10 is a right side elevation view showing a slitted foldover type of check valve;

FIG. 10A is a partial cross sectional view showing the slitted foldover type of check valve in a closed position;

FIG. 10B is a partial cross sectional view showing the slitted foldover type of check valve in an open position;

DETAILED DESCRIPTION OF ILLUSTRATIVE EMBODIMENTS

Figure 1:
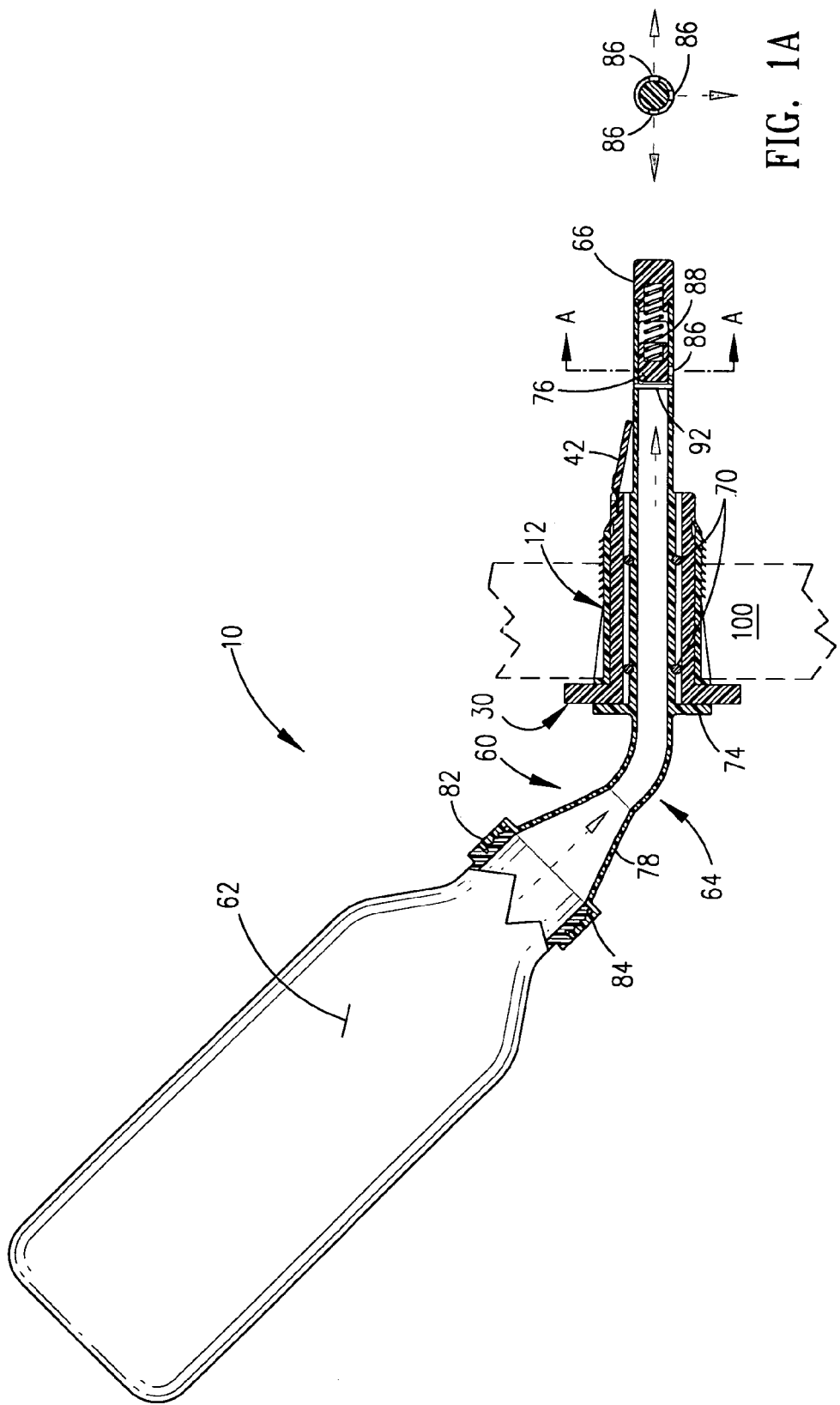
FIG. 1 is a partial cross sectional view of an illustrative embodiment of a pesticide injection system of the instant invention in use.

Looking more particularly to the drawings, there is shown in FIG. 1 an illustrative embodiment of a pesticide injection system, which is generally indicated at 10, according to an embodiment of the present invention.

FIG. 1 is a partial cross sectional view of an illustrative embodiment of a pesticide injection system 10 of the instant invention in use.

FIG. 1A is a cross sectional view taken along the plane A—A of the instant invention 10 of FIG. 1.

As best seen in FIG. 1 and in FIGS. 2–10, 1A, 2A, 3A, 10A, 10B, 20 and 21, the pesticide injection system 10, comprises an insert 12, a plug 30 matingly and fixedly engageable with the insert 12; an applicator 60 having a pliable bottle 62 for receiving a powder pesticide and a nozzle 64 for injecting the powder pesticide into a wall 100 at low pressure by squeezing the pliable bottle 62. The nozzle 64 has an end cap 66 for displacing insulation 104 to permit the powder pesticide to be injected and to be dispersed directly onto a blind space 106 behind the wall 100 suspected of harboring insects without the powder pesticide contacting the insulation; and means for sealing the nozzle 64 to prevent the powder pesticide from spilling into a living space during use.

Figure 20:
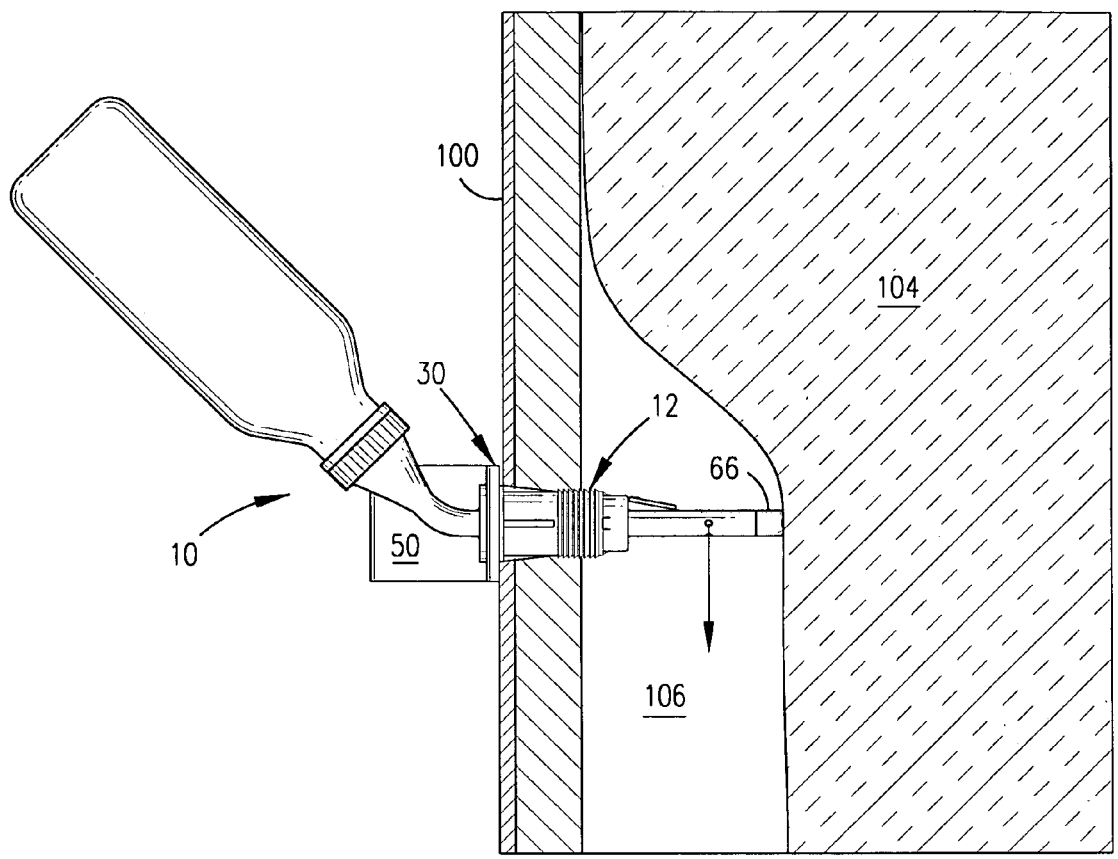
FIG. 20 is a cross sectional view showing a pesticide injection system in operation as installed into a wall with the insulation displaced and the powder pesticide discharged into a blind space behind the wall.
Figure 21:
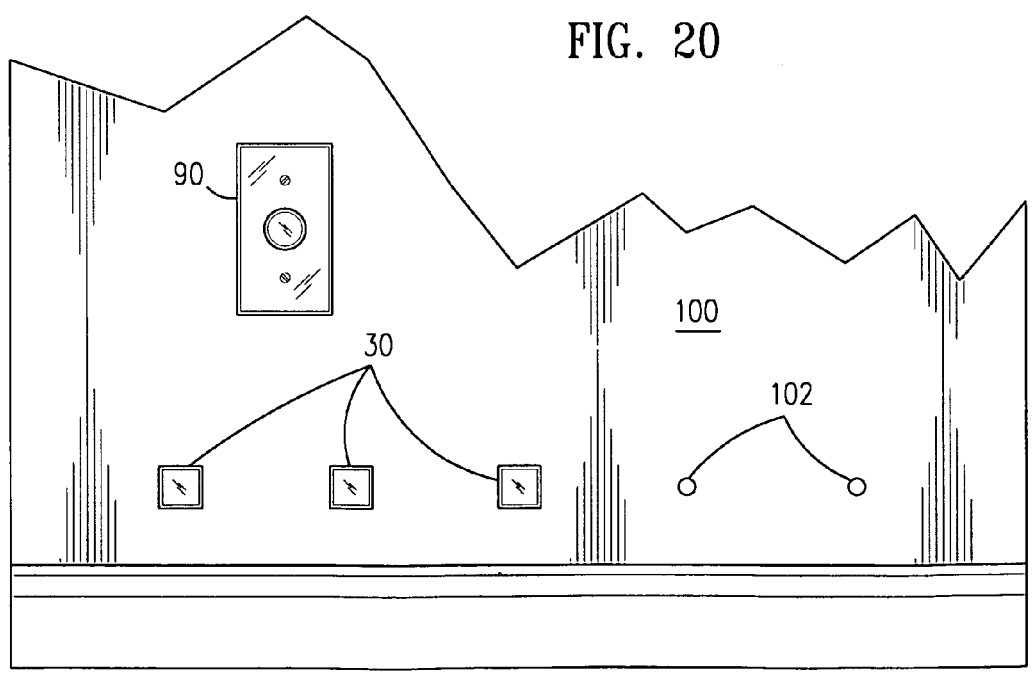
FIG. 21 is a front elevation view showing the mounting of the plug and wall plate onto a wall.

As best seen in FIG. 4 and in FIG. 7, the insert 12 has a first end 14 and a second end 16 and a longitudinal bore 24 therethrough; a taper 22; a plurality of ribs 18 near the first end 14 and a plurality of fins 20 near the second end 16 each being frictionally engagable with the wall 100 so that the insert 12 is fixed when placed into a hole 102 therein the wall 100 as seen in FIGS. 4, 20 and 21.

As best seen in FIG. 4, the plug 30 has a tube 32 with a first end 34 and a second end 36 and a locking tab 38 thereon the tube 32 near the second end 36 for cooperatively engaging a portion of the plurality of fins 20 of the insert 12. The tube 32 has means for preventing back flow disposed on the second end 36 of the tube 32; a flange 46 integral with the tube 32 and means for selectively covering the first end 34 of the tube 32.

The means for preventing back flow disposed on the second end 36 of the tube 32 is one of a spring loaded swing check valve 42 shown in FIGS. 1, 2, 4, 17 and 18 and a slitted foldover type check valve 44 best seen in FIGS. 10, 10A 10B and in FIG. 3.

FIG. 6 is a right side elevation view of the plug 30 and the insert 12 assembly of FIG. 4 showing the spring loaded swing check valve 42 having a spring 26 and the flange 46.

The means for selectively covering the first end 34 of the tube 32 is a door 50 with a hinge 52 and a snap lock 54 thereon cooperatively engaging the flange 46 as best seen in FIG. 9.

FIG. 5 is a front elevation view showing the plug 30 of FIG. 4. Although the door 50 is shown as square, it is understood that other shapes, including, but not limited to, round, triangular and hexagonal, are within the scope of this disclosure.

As seen in FIG. 1, the nozzle 64 is removably attachable to the pliable bottle 62 and insertable into the plug 30. The nozzle 64 has a stop 74 to limit insertion into the plug 30 and to seal the first end 34 of the tube 32 during use. The pliable bottle 62 has a screw cap 82 with an "O" ring cap seal 84.

The means for sealing the nozzle 64 to prevent the powder pesticide from spilling into a living space during use is one of an "O" ring 70 and a ribbed seal 72.

The nozzle 64 and other illustrative embodiments nozzles 64A, 64B and 64C have an angular portion 78; alternately, the nozzles 64D, 64E; 64F and 64G are straight.

The pesticide injection system 10 further comprises a sliding spring check valve 76 which cooperates with an aperture 86 disposed thereon the nozzle 64 for discharging the powder pesticide, thereby preventing the powder pesticide from spilling into the living space when the nozzle 64 is withdrawn from the plug 30. The sliding spring check valve 76 has a compression spring 88 and a pin 92 to restrain motion of the sliding spring check valve 76.

Figure 18:
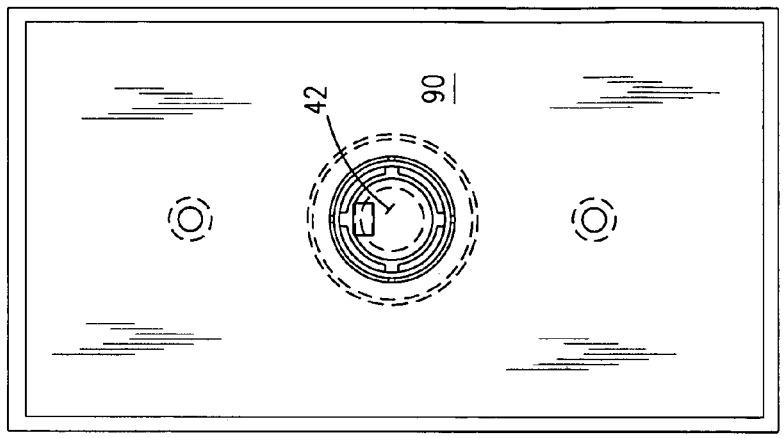
FIG. 18 is a rear elevation view of the wall plate of FIG. 16 showing a spring loaded swing check valve.
Figure 17:
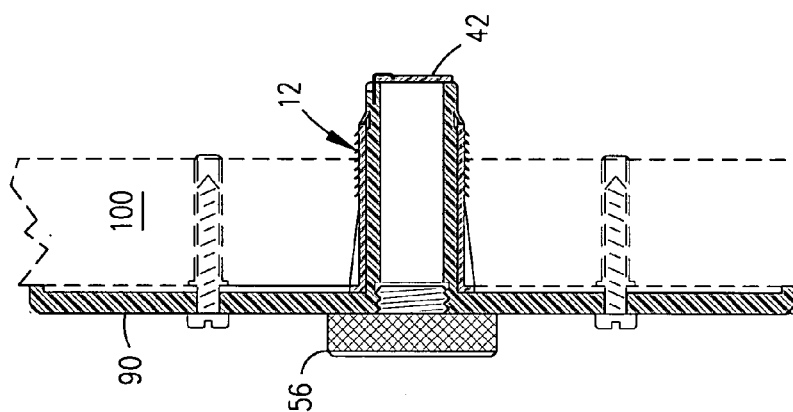
FIG. 17 is a cross sectional view of the wall plate of FIG. 16 installed on a wall shown in phantom.
Figure 16:
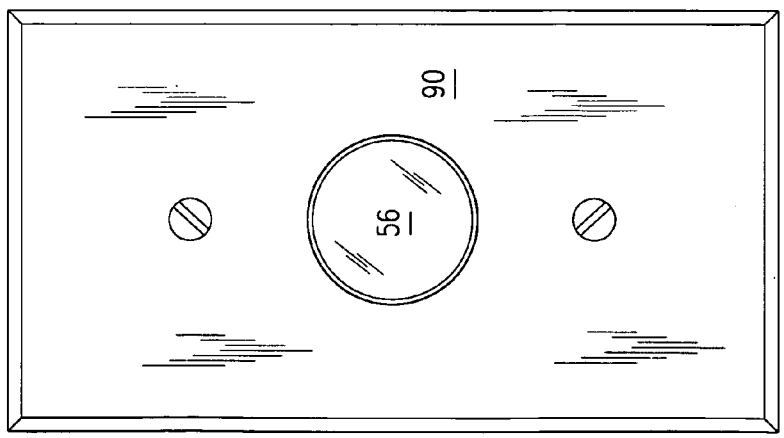
FIG. 16 is a front elevation view of a wall plate.
Figure 19A:
FIG. 19A is a side elevation view of the alternate flush mounted cap of FIG. 19.
Figure 19:
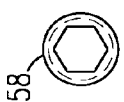
FIG. 19 is a front elevation view of an alternate flush mounted cap.

The plug 30 may take the form of a wall plate 90 seen in FIGS. 16–18, with the insert 12 and the plug 30 details essentially as earlier described herein and shown in detail in FIG. 4 and in FIG. 7 with the exception being that a portion of the tube 32 of the wall plate 90 is threaded. The means for selectively covering the first end 34 of the tube 32 is a cap 56. The cap 56 may alternately be a flush mounted cap 58 as seen in FIGS. 19 and 19A. Although not necessary for operation, the wall plate 90 may alternately have mounting screws shown in phantom The nozzle 64, plug 30 and the insert 12 and pliable bottle 62 are plastic molded.

To use the pesticide injection system 10, a user drills a hole 102 into the wall 100 and pushes the insert 12 into the hole 102. The plug 30 is pushed into the insert 12 thereby frictionally engaging the wall 100 and being further retained permanently in place by the locking tab 38 and by a portion of the plurality of fins 20. The door 50 is normally closed when installed. When ready to treat a suspected insect infested area, the door 50 is opened and the nozzle 64 of the applicator 60 is inserted into the plug 30 until the stop 74 contacts the flange 46. Any insulation 104 is pushed away during the process as seen in FIG. 20.

In operation, a user simply squeezes the pliable bottle 62 injecting powder pesticide into a blind space 106 behind the wall 100 through the aperture 86 in the nozzle 64. Direction of injection of the powder pesticide is shown via arrows as indicated in FIGS. 1, 1A, 2, 2A, 3, 3A and 20.

Figure 2:
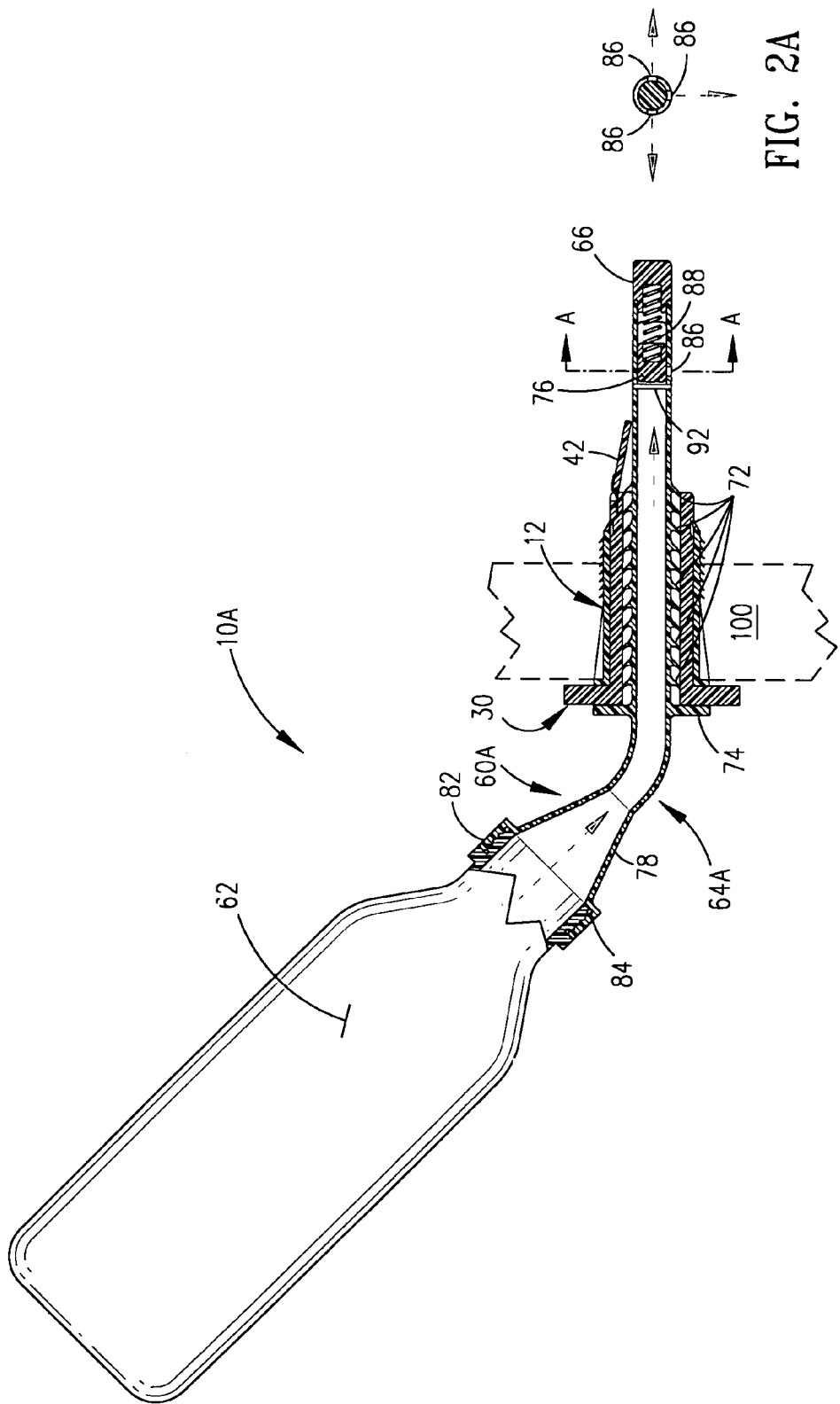
FIG. 2 is a partial cross sectional view of a second illustrative embodiment of a pesticide injection system of the instant invention in use.

FIG. 2 is a partial cross sectional view of a second illustrative embodiment, 10A of a pesticide injection system of the instant invention in use. Applicator 60A has a nozzle 64A with an angular portion 78 and with a ribbed seal 72; the remaining components of pesticide injection system 10A being constructed in a manner as described above for pesticide injection system 10.

FIG. 2A is a cross sectional view taken along the plane A—A of the instant invention 10 A of FIG. 2.

FIG. 3 is a partial cross sectional view of a third illustrative embodiment, 10B of a pesticide injection system of the instant invention in use. Applicator 60B has a nozzle 64D, which is straight; an "O" ring 70; a slitted foldover type check valve 44 and an end cap 66A. The remaining components of pesticide injection system 10B being constructed in a manner as described above for pesticide injection system 10.

FIG. 3A is a cross sectional view taken along the plane A—A of the instant invention of FIG. 3.

Figure 11:
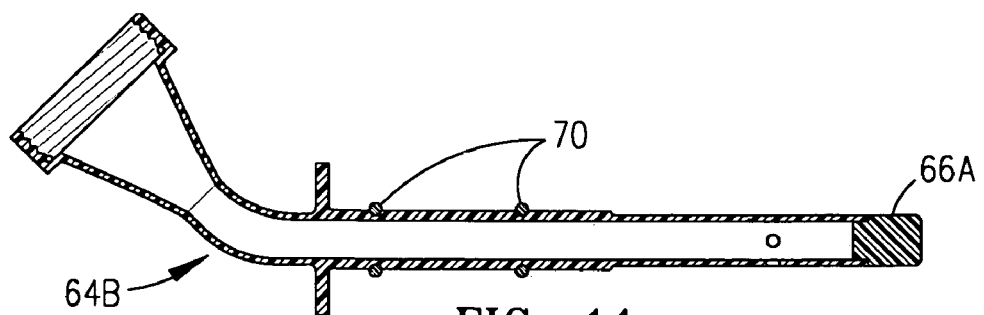
FIG. 11 is a cross sectional view of an illustrative embodiment of a nozzle with an anglular portion, an "O" ring seal and an alternative end cap.

FIG. 11 is a cross sectional view of an illustrative embodiment of a nozzle 64B with an anglular portion, an "O" ring seal 70 and an alternative end cap 66A.

Figure 12:
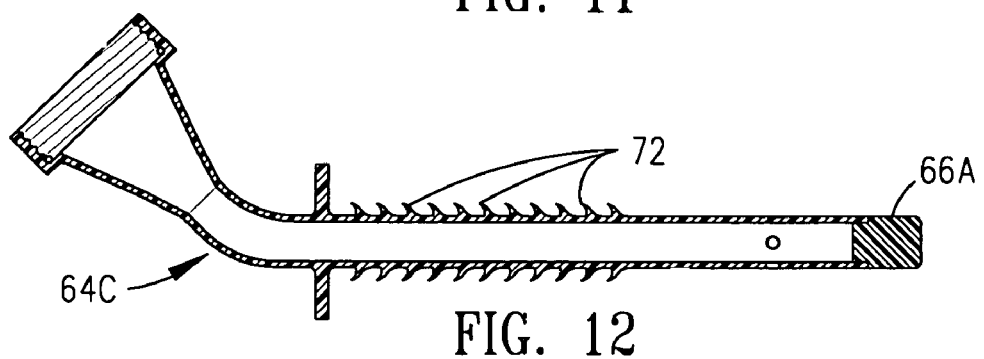
FIG. 12 is a cross sectional view of an illustrative embodiment of a nozzle with an anglular portion, a ribbed seal and an alternative end cap.

FIG. 12 is a cross sectional view of an illustrative embodiment of a nozzle 64C with an anglular portion, a ribbed seal 72 and an alternative end cap 66A.

Figure 13:
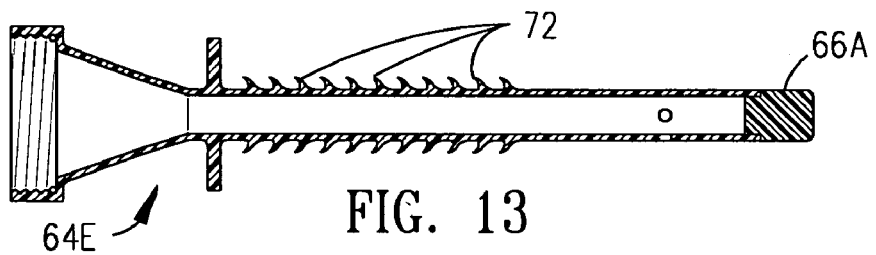
FIG. 13 is a cross sectional view of an illustrative embodiment of a straight nozzle with a ribbed seal and an alternative end cap.

FIG. 13 is a cross sectional view of an illustrative embodiment of a straight nozzle 64E with a ribbed seal 72 and an alternative end cap 66A.

Figure 14:
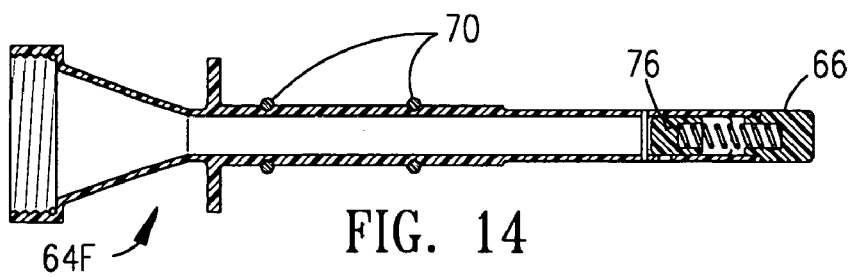
FIG. 14 is a cross sectional view of an illustrative embodiment of a straight nozzle with an "O" ring seal, an end cap and a sliding spring check valve.

FIG. 14 is a cross sectional view of an illustrative embodiment of a straight nozzle 64F with an "O" ring seal 70, an end cap 66 and a sliding spring check valve 76.

Figure 15:
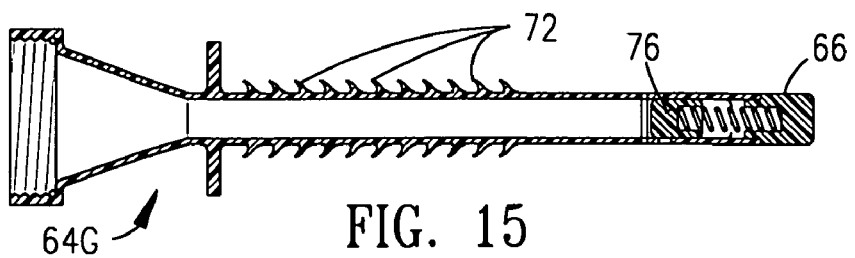
FIG. 15 is a cross sectional view of an illustrative embodiment of a straight nozzle with a ribbed seal, an end cap and a sliding spring check valve.

FIG. 15 is a cross sectional view of an illustrative embodiment of a straight nozzle 64G with a ribbed seal 72 an end cap 66 and a sliding spring check valve 76.

It is understood that pesticide injection system 10, 10A and 10B are illustrated embodiments which may have various combinations of the components described above without departing from this disclosure. A few of the wide variety of combinations and variations that are apparent from the disclosure herein are shown in FIGS. 1, 2, 3, 11–21.

From the above, it is understood that the pesticide injection system 10, 10A and 10B may be fabricated from a wide variety and combinations of materials and in a various styles, colors, shapes and designs and being fully capable and readily adaptable to fit any structure without departing from this disclosure.

The applicant has actually reduced the invention to practice by constructing a working prototype according to the teachings of this invention.

The applicant has recognized a need and have solved a heretofore unknown problem in the prior art in creating a pesticide injection system 10, 10A and 10B. Surprisingly, the instant invention provides an added advantage and recognizes a problem and adequately and completely addresses an unfulfilled need, in that the pesticide injection system 10, 10A and 10B and variations thereof in the manner disclosed, in effect, defines a highly functional and useful apparatus that is not presently available. This is due entirely to the particular way the applicant designed and fabricated the pesticide injection system 10, 10A and 10B and the other embodiments disclosed herein which are not found or taught in the prior art. By doing so, the applicant is able to use inexpensive materials in the fabrication without sacrificing performance, rather, achieving superior unexpected results, due to the particular construction which is cost effective.

One practical advantage of the invention is that it provides a convenient, practical, low cost, pesticide injection system 10, 10A and 10B which allows a user to conveniently, and in an efficient manner, to safely and conveniently apply a powder pesticide as a preventive measure and for eradicating any insects nesting in a normally inaccessible cavity of a wall structure. Still another advantage is that the pesticide injection system 10, 10A and 10B is designed for ease of manufacture by standard methods such as by plastic molding and by using readily available materials particularly chosen for the problem solved. Furthermore, the pesticide injection system 10, 10A and 10B and variations may be provided for example, as a kit of, six pre-filled powder pesticide pliable bottles 62 with about 4 oz of powder pesticide and with six nozzles 64, to readily allow a way for a do-it-yourselfer to safely apply the powder pesticide.

Of course, a wide variety of further uses and advantages of the present invention will become apparent to one skilled in the art. As disclosed, it is apparent that one skilled in the art will realize that the foregoing discussion outlines the more important features of the invention to enable a better understanding of the instant invention and to instill a better appreciation of the inventors contribution to the art. It must be clear that the disclosed details of construction, descriptions of geometry and illustrations of inventive concepts are mere examples of possible manifestations of the invention.

Although the invention has been shown and described with reference to certain illustrative embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A pesticide injection system comprising:
    an insert having a first end and a second end and a longitudinal bore therethrough; a plurality of tapered ribs near said first end and a plurality of fins near said second end each being frictionally engagable with a wall so that said insert is fixed when placed into a hole therein the wall;
    a plug matingly and fixedly engageable with said insert; said plug having a tube with a first end and a second end and a locking tab thereon said tube near said second end for cooperatively engaging a portion of said plurality of fins of said insert; means for preventing back flow disposed on said second end of said tube; a flange integral with said tube; means for selectively covering said frst end of said tube;
    an applicator having a pliable bottle for receiving a powder pesticide and a nozzle for injecting the powder pesticide into the wall said nozzle removably attachable to said pliable bottle and insertable into said plug;
    said nozzle having an end cap for displacing insulation to permit the powder pesticide to be injected and to be dispersed directly into a blind space behind the wall suspected of harboring insects without the powder pesticide contacting the insulation; and
    means for sealing said nozzle to prevent the powder pesticide from spilling into a living space during use.

2. The pesticide injection system of claim 1 wherein said means for preventing back flow disposed on said second end of said tube is a spring loaded swing check valve.

3. The pesticide injection system of claim 1 wherein said means for preventing back flow disposed on said second end of said tube is a slitted foldover type of check valve.

4. The pesticide injection system of claim 1 wherein said means for selectively covering said first end of said tube is a door with a hinge and a snap lock thereon cooperatively engaging said flange.

5. The pesticide injection system of claim 1 wherein said means for sealing said nozzle to prevent the powder pesticide from spilling into the living space during use is one of an "O" ring and a ribbed seal.

6. The pesticide injection system of claim 1 wherein said nozzle has a stop to limit insertion into said plug and to seal said first end of said tube during use.

7. The pesticide injection system of claim 1 further comprising a sliding spring check valve which cooperates with an aperture disposed thereon said nozzle for discharging the powder pesticide, thereby preventing the powder pesticide from spilling into the living space when said nozzle is withdrawn from said plug.

8. The pesticide injection system of claim 1 wherein said nozzle has an angular portion.

9. The pesticide injection system of claim 1 wherein said nozzle is straight.

10. The pesticide injection system of claim 1 wherein said nozzle, said plug and said insert are plastic molded.

11. The pesticide injection system of claim 1 wherein said pliable bottle has a screw cap with an "O" ring cap seal.

12. The pesticide injection system of claim 1 wherein said plug is a wall plate.

13. The pesticide injection system of claim 1 wherein said means for selectively covering said first end of said tube is a cap.

14. A pesticide injection system comprising:
    an insert having a first end and a second end and a longitudinal bore therethrough; a plurality of tapered ribs near said first end and a plurality of fins near said second end each being frictionally engagable with a wall so that said insert is fixed when placed into a hole therein the wall;
    a plug matingly and fixedly engageable with said insert; said plug having a tube with a first end and a second end and a locking tab thereon said tube near said second end for cooperatively engaging a portion of said plurality of fins of said insert; means for preventing back flow disposed on said second end of said tube; a flange integral with said tube; a door with a hinge and a snap lock thereon cooperatively engaging said flange;
    an applicator having a pliable bottle for receiving a powder pesticide and a nozzle for injecting the powder pesticide into the wall said pliable bottle having a screw cap with an "0" ring cap seal; said nozzle removably attachable to said pliable bottle and insertable into said plug; said nozzle having an end cap for displacing insulation to permit the powder pesticide to be injected and to be dispersed directly into a blind space behind the wall suspected of harboring insects without the powder pesticide contacting the insulation; a stop to limit insertion into said plug; and means for sealing said nozzle to prevent the powder pesticide from spilling into a living space during use.

15. The pesticide injection system of claim 14 wherein said means for sealing said nozzle to prevent the powder pesticide from spilling into the living space during use is one of an "O" ring and a ribbed seal.

16. The pesticide injection system of claim 14 wherein said means for preventing back flow disposed on said second end of said tube is one of spring loaded swing check valve and a slitted foldover type of check valve.

17. The pesticide injection system of claim 14 further comprising a sliding spring check valve which cooperates with an aperture disposed thereon said nozzle for discharging the powder pesticide, thereby preventing the powder pesticide from spilling into the living space when said nozzle is withdrawn from said plug.

18. The pesticide injection system of claim 14 wherein said nozzle has an angular portion.

19. The pesticide injection system of claim 14 wherein said nozzle is straight.

20. A method for safely injecting a powder pesticide into a cavity behind a wall comprising the steps:
    providing an insert having a first end and a second end and a longitudinal bore therethrough; a plurality of tapered ribs near said first end and a plurality of fins near said second end;
    drilling a hole in a wall;
    placing said insert into the hole therein the wall;
    providing a plug having a tube with a first end and a second end and a locking tab thereon said tube near said second end for cooperatively engaging a portion of said plurality of fins of said insert; means for preventing back flow disposed on said second end of said tube; a flange integral with said tube; a door with a hinge and a snap lock thereon cooperatively engaging said flange;
    matingly and fixedly engaging said plug with said insert;

providing an applicator having a pliable bottle with a powder pesticide and a nozzle for injecting the powder pesticide into the wall;

providing said pliable bottle with a screw cap having an "0" ring cap seal;

providing said nozzle with an end cap for displacing insulation to permit the powder pesticide to be injected and to be dispersed directly into a blind space behind the wall suspected of harboring insects without the powder pesticide contacting the insulation', a stop to limit insertion into said plug;

providing means for sealing said nozzle to prevent powder pesticide from spilling into a living space during use wherein said means for sealing said nozzle to prevent the powder pesticide from spilling into the living space during use is one of an "0" ring and a ribbed seal;

attaching said nozzle to said pliable bottle, inserting said nozzle into said plug, with said door open, until said stop contacts said flange and thereby pushes the insulation away;

squeezing said pliable bottle to expel the power pesticide through an aperture into the blind space behind the wall; and closing said door after said nozzle is withdrawn.

\* \* \* \* \*